United States Patent [19]
Herndon

[11] 3,801,128
[45] Apr. 2, 1974

[54] TRAILER STABILIZER
[76] Inventor: Robert R. Herndon, 207 S. Mtn. St., Smithville, Tenn. 37166
[22] Filed: June 7, 1972
[21] Appl. No.: 260,656

Related U.S. Application Data
[63] Continuation-in-part of Ser. No. 103,784, Jan. 4, 1971, Pat. No. 3,690,694.

[52] U.S. Cl. .......................................... 280/150.5
[51] Int. Cl. ............................................ B60s 9/02
[58] Field of Search.................... 280/150.5; 248/166

[56] References Cited
UNITED STATES PATENTS
| | | | |
|---|---|---|---|
| 3,236,501 | 2/1966 | McKay | 280/150.5 |
| 2,634,941 | 4/1953 | Eckert | 280/150.5 |
| 2,924,463 | 2/1960 | Livermont | 280/150.5 |
| 2,908,472 | 10/1959 | McDonald | 280/150.5 |

FOREIGN PATENTS OR APPLICATIONS
| | | | |
|---|---|---|---|
| 546,573 | 7/1942 | Great Britain | 280/150.5 |

Primary Examiner—Robert R. Song
Attorney, Agent, or Firm—Terry M. Crellin

[57] ABSTRACT

A pair of extensible leveling and stabilizing legs are connected pivotally to the underside of a trailer, the legs can be raised from their ground engaging position to a retracted position, in the ground engaging position the legs extend downward to the ground in an outward direction transverse to the longitudinal axis of the trailer. Force means are provided which tend to move the legs toward each other and thus continuously maintain stabilizng and leveling contact of the ground engaging portion of the legs with the ground. The force means can also be used to maintain the legs in a raised and retracted position.

9 Claims, 9 Drawing Figures

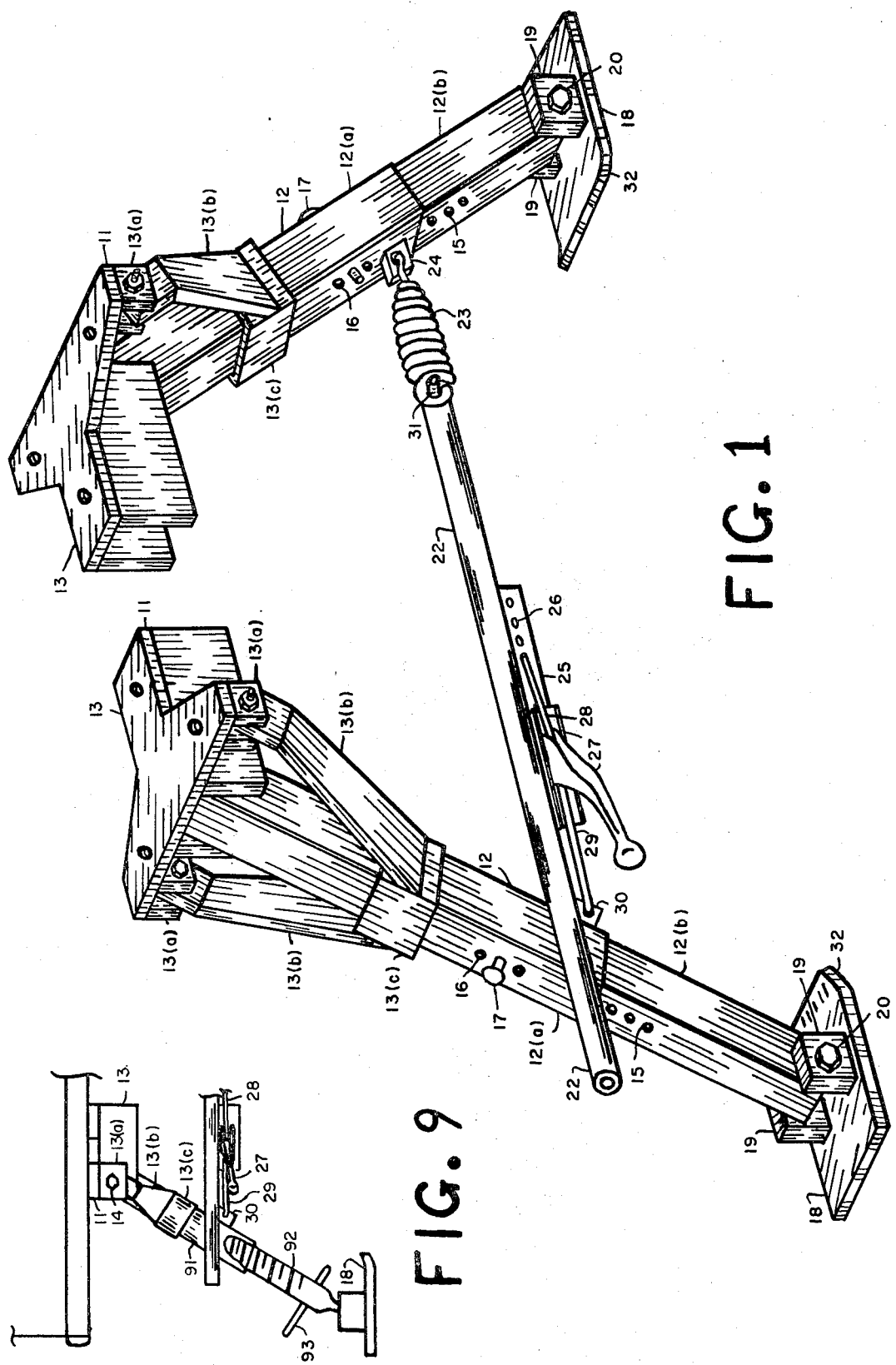

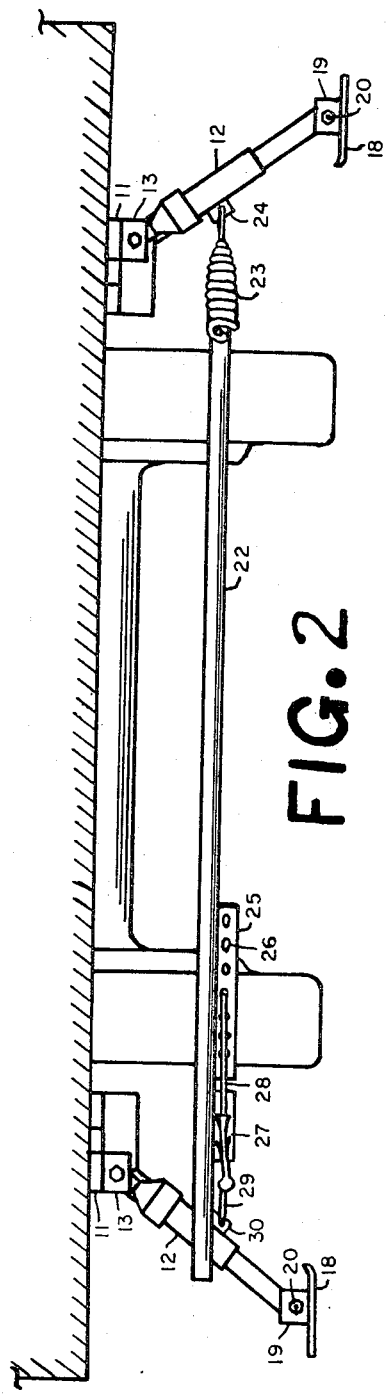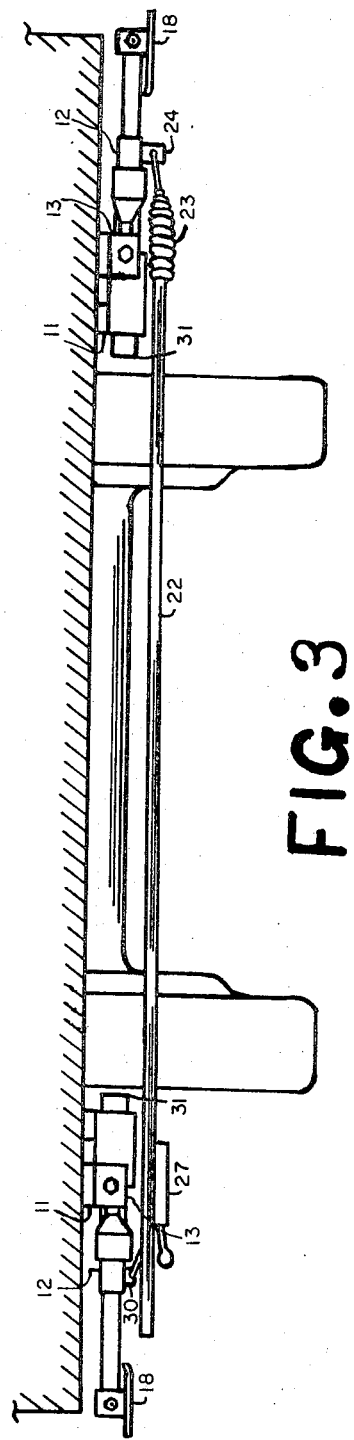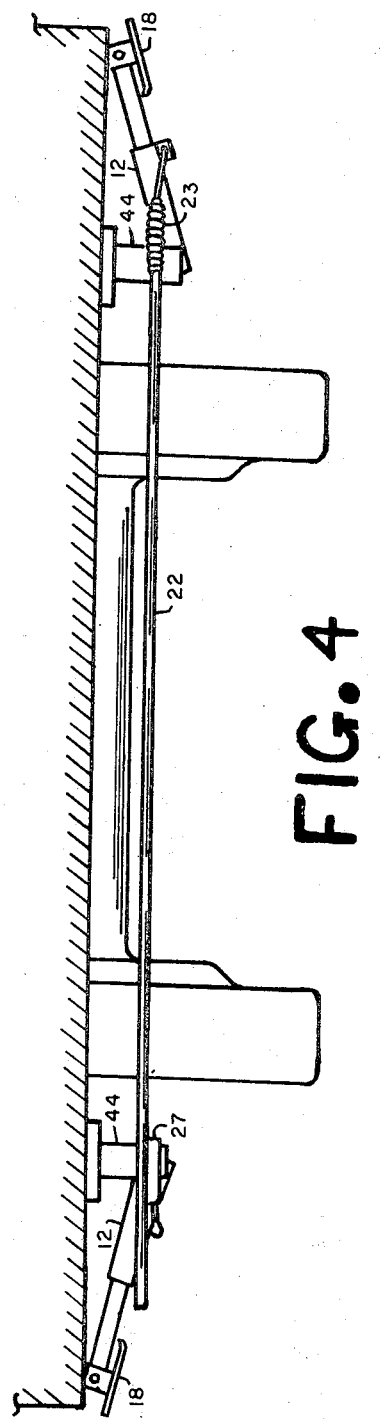

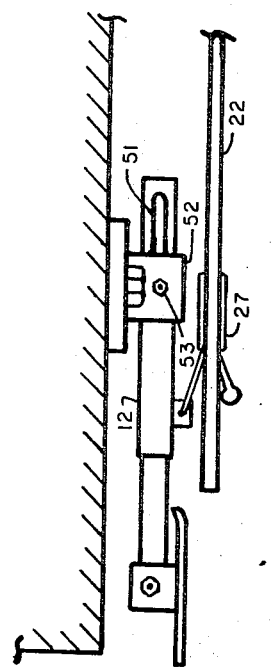
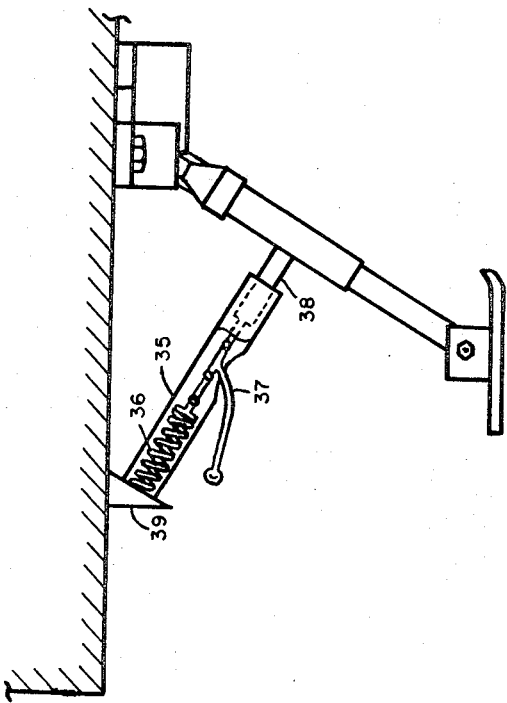
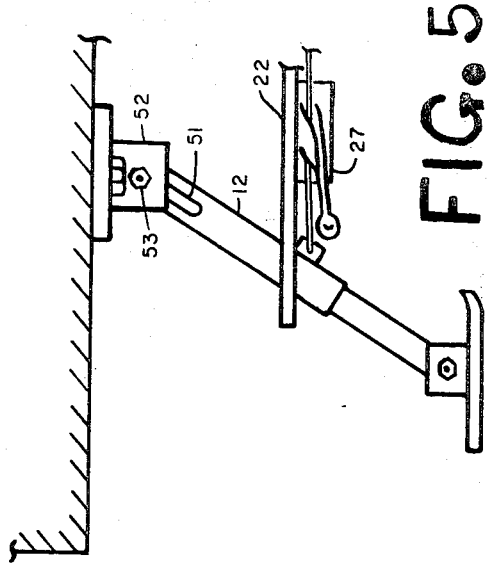
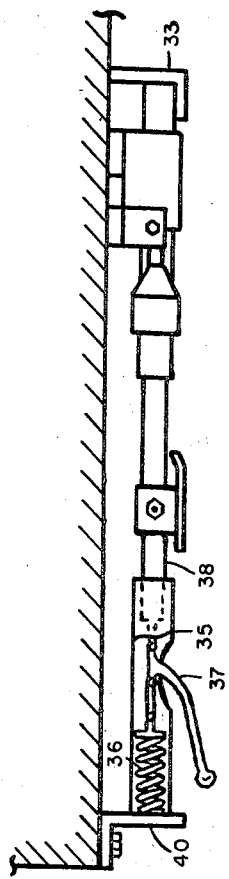
FIG. 6
FIG. 7
FIG. 5
FIG. 8

TRAILER STABILIZER

This application is a continuation-in-part of my copending application, Ser. No. 103,784, filed Jan. 4, 1971, now U.S. Pat. No. 3,690,694, the entire contents of which are incorporated herein by reference.

BACKGROUND OF THE INVENTION

The present invention relates to an improved device for supporting parked trailers in a level and stable condition. In addition, the present device automatically adjusts as the ground underneath the support compacts or shifts due to weight of the trailer and the movement of people within the trailer, thus retaining stable and level support of the trailer. Further, the improved trailer supporting device of the present invention can be retracted and held beneath the trailer during periods of non-use of the supporting device, such as when the trailer is being pulled on the road.

A retractable stabilizing and leveling support assembly for trailers is disclosed in U.S. Pat. No. 3,454,251, issued July 8, 1969, comprising a pair of extensible legs connected pivotally to laterally spaced longitudinal beams of a trailer frame. The legs are interconnected when in the supporting position by elongated tie rods which are adjustable in length to accommodate variable spacings between legs. The tie rods are removable, whereupon the supports can be swung up and individually latched in a retracted position.

The trailer support assembly of U.S. Pat. No. 3,454,251 has several inconvenient features, especially when utilized to stabilize trailers such as mobile homes or campers. In positioning the stabilizer apparatus of U.S. Pat. No. 3,454,251, several steps are necessary, including loosening of the pivot nut, swinging the support leg down, adjusting the length of the support leg and finally connecting the tie rods between the two stabilizer legs. Such a tedious, time consuming procedure is not convenient, especially when the trailer is a mobile home or trailer which is frequently being moved and where the stabilizer apparatus is being positioned and retracted quite frequently. The support legs in the apparatus of U.S. Pat. No. 3,454,251 must each be individually raised or lowered. It would be convenient to have a stabilizer system for mobile homes, campers and other trailers which are frequently moved, which can be positioned and retracted in a simple manner requiring no outside tools or equipment.

In addition, it would be desirable to have a stabilizer apparatus which would automatically adjust to compensate for compacting or moving of the earth or other support on which the stabilizer rests. Mobile homes are especially prone to settling problems, due to the movement of persons within the house trailer, which creates a rocking and tilting motion, which in turn transfers the major portion of the weight of the trailer from one support to the other. The ground underneath the supports tends to compact under this rocking and tilting and ultimately the support becomes loose. With the devices of the prior art, one had to adjust each leg manually to counteract this loosening tendency.

A device is shown in U.S. Pat. No. 2,924,463 wherein the support legs pivot from the frame of the trailer and rest on the ground at an angle. A support member having a section of chain is hooked between the two legs. To adjust the legs, the weight of the trailer must be lifted by an auxiliary means so that the support legs are free. The chain member portion of the support member is shortened so as to draw the two legs together or lengthened to allow the two legs to separate, depending on whether the adjustment made is to raise or lower the support for the trailer. This is a disadvantage to the trailer owner each time he desires to re-adjust the support legs.

Other methods of adjusting the length of the support legs using methods similar to the common means used in jacking of an automobile to change a tire are disclosed in U.S. Pat. NO. 2,162,181, 2,634,941, 2,979,304, 3,093,362, 3,096,065 and 3,167,327.

SUMMARY OF THE INVENTION

Broadly, the present invention provides a trailer stabilizing and leveling support assembly comprising two support members which are connected by an attachment means to the bottom of the trailer frame in such a manner as to be pivoted at the point of connection and means for applying a force to the support members in a direction transverse to the trailer and towards the longitudinal axis of the trailer. A preferred means for applying the force to the support members being a bar and a spring tension mechanism connecting the two support members, the bar and spring tension member being connected to one support member by the spring and to the other support member by a toggle mechanism which is attached to the bar of the bar and spring tension member, the bar and spring being connected to each other axially. At the end opposite that which connects to the trailer, the support members have plates pivotally mounted to the support members which act as foot members. In addition, there are means, to be fully described hereinafter, for holding the support members adjacent the bottom of the trailer when the support members are in their retracted position.

The operation of the apparatus of the present invention is extremely simple and easy. A more detailed description of the operation is given hereinafter. Briefly, the toggle mechanism is released allowing the two support members to be released from the means holding the support members adjacent the bottom of the trailer. The support members are rotated down so that they extend downwardly and ouwardly in the direction of the sides of the trailer with the foot members contacting the ground so that the support members form an acute angle to the perpendicular through their point of connection to the trailer. The rod and spring mechanism is connected to the support members and the toggle mechanism is then closed. This creates a tension in the bar spring member and draws the legs towards each other until the foot members are held firm against the ground. As the trailer is rocked or tilted by movement of people therein, the ground underneath the foot members may compact or give away. If this happens, the apparatus of the present invention automatically counteracts such by the two support members being drawn towards each other, thus, maintaining the foot members in firm contact with the ground. To release the support members, the toggle mechanism on the bar spring member is released, the legs swung up and into engagement with means for holding the support members adjacent the bottom of the trailer. The rod and spring mechanism is again attached to the support members and the toggle mechanism closed to firmly hold the support members in their withdrawn position.

It is thus the principal object of the present invention to provide a stabilizing and leveling support assembly which overcomes the complex and tedious operation involved in engaging and retracting the support members for a mobile trailer of the prior art apparatus.

Another important object of the present invention is to provide a stabilizing and support assembly which automatically adjusts for compacting and shifting of the ground underneath the support leg, which if not adjusted for, results in the support leg becoming loose which allows the trailer to become unstable.

The foregoing and other objects and advantages of this invention will appear from the following detailed description taken in connection with the accompanying drawing of the preferred embodiment.

BRIEF DESCRIPTION OF THE DRAWING

FIG. 1 is a perspective view showing one preferred embodiment of the stabilizing and leveling support assembly of this invention.

FIG. 2 is an end elevation showing a trailer equipped with the embodiment of the stabilizer mechanism shown in FIG. 1 with the stabilizer apparatus in its support position.

FIG. 3 is an end elevation showing the apparatus of FIG. 2 in its retracted position.

FIG. 4 is an end elevation showing a trailer equipped with another preferred embodiment of the stabilizing and leveling support assembly of this invention with the apparatus in its retracted position.

FIG. 5 is a partial end view showing a trailer equipped with a further preferred embodiment of the support assembly of this invention with the apparatus in the support position.

FIG. 6 is a partial end view showing the apparatus of FIG. 5 in the retracted position.

FIG. 7 is a partial end view showing a second embodiment of apparatus for exerting a force on the support members.

FIG. 8 shows the apparatus of FIG. 7 in the retracted position.

FIG. 9 is a partial end view showing a further embodiment of the leg assemblies of this invention.

DESCRIPTION OF THE PREFERRED EMBODIMENT

Referring particularly to FIG. 1 of the drawing, there is shown for purposes of illustration, a perspective view of one preferred embodiment of the apparatus of the present invention. The apparatus comprises two leg members 12 which have attaching means 13 attached at one end thereof. The attaching means shown comprises plate 11 and a channel shaped brackets 13(a) which have 2 extension members 13(b) attached thereto to the channel shaped members 13 for pivotal movement in a vertical plane about pivot point 14. The extension members have attached at their opposite ends bracket means 13(c) which are coaxial with and slidably receive the leg assembly 12.

Each leg member 12 comprises two elongated, hollow sections 12a and 12b. The lower leg section 12b is received slidably within the hollow upper leg section 12a for telescopic adjustment. The lower section 12b has a plurality of transverse openings 15 therein located along its length. Section 12a has at least a single opening 16 and, preferably, a plurality of openings 16. The openings 15 and 16 are arranged respectively to register in pairs for the reception of a locking pin 17. The leg sections thus may be secured together in a plurality of desired positions of relative extension and retraction, to provide a desired overall leg length. To provide incremental adjustment, the spacing between opening 16 in the upper leg section is made different from the spacing between openings 15 in the lower section. For example, by spacing the openings in the lower leg section 12b three-quarters of an inch between centers and in the upper leg section 12 a one-half inch between centers, incremental adjustments of one-quarter inch are provided. Alternatively, a single opening can be placed in upper section 12a and the openings spaced one-half inch between centers in the lower section 12b whereupon incremental adjustments of one-half inch are provided.

The bottom end of the lower leg section 12b is provided with a ground engaging foot member 18 pivotally attached thereto. As is shown in FIG. 1, two brackets 19 are integrally attached to foot means 18 enclosing two sides of the bottom and of leg section 12b. A nut and bolt 20 secures the foot member to the end of leg member 12b so that the foot member 18 can rotate about the longitudinal axis of the nut and bolt 20.

Means are provided for maintaining a force tending to move the leg members toward each other. In the embodiment shown in FIGS. 1 – 5, a rod 22 and spring 23 connect the leg members 12. The rod 22 and spring 23 are longitudinally attached to each other end to end so that the spring 23 extends from one end of the rod 22. The end of the spring 23 which extends from rod 22 is attached to one of the leg members 12 (in FIG. 1 the spring is shown attached to a lug 24 which is in turn attached to the right leg member 12). The second leg member 12 is detachably attached to rod 22 by means of a toggle mechanism 27. The toggle mechanism 27 as shown in FIG. 1 is attached to a lug 30 by means of a hooked extension 29. The lug 30 is in turn integrally attached to leg member 12. The toggle mechanism 27 is detachably connected to the bar 25 of rod 22 as shown in FIG. 1 by a hooked extension 28 which engages any one of a plurality of openings 26 in bar 25. Preferably, the end of rod 22 opposite the spring 23, extends beyond the second leg member 12 as shown in FIG. 1.

The operation of the apparatus shown in FIG. 1 is best explained with reference to FIGS. 2, 3 and 4 wherein the assembly is shown attached to the underside of the trailer 31. A stabilizer assembly is normally installed on both the front or back ends of the trailer; however, this is not essential, the stabilizer assembly can be installed on the front alone or the back alone in addition to being installed on both. The stabilizer assembly can be installed during the manufacture of the trailer or can be installed as an addition to an existing trailer. The assembly is identical in construction and operation whether installed on the front or the back end of the trailer, and, therefore, only the rear assembly is illustrated in detail in FIGS. 2, 3 and 4.

Each leg member is detachably secured to the trailer by appropriate means without modifying the trailer. In the drawings, plate 11 is attached to the underside of the trailer and, preferably, to the frame of the trailer.

The desired length of the leg member 12 can be predetermined with reference to the particular trailer to which it is to be secured. The only critical requirement as to length of leg members 12 is that it be adjustable to be greater than the perpendicular distance from the ground to the plate 11. Normally, the desired length is selected so that the leg member 12 is inclined at an angle of approximately 30° with respect to perpendicular, however, as mentioned above, this is not critical. The particular length of leg member 12 is adjusted as explained hereinbefore by withdrawing pin 17 and extending member 12b to a position within the desired range wheere the openings in member 12a and 12b register and then replacing pin 17. Under normal conditions, this length need never be readjusted. However, if the trailer is parked where the ground on which the support leg rests is somewhat higher or lower than the ground upon which the trailer wheels are resting, it may be necessary to adjust the length of the leg members 12 accordingly. The leg members 12 are positioned so that they extend downward and outward in a lateral direction away from longitudinal axis of the trailer as shown in FIG. 2 and in phantom in FIG. 3 with the foot members 18 on the ends thereof resting on the ground.

The rod 22 and spring 23 are attached to each other as is shown in FIG. 1 by hooking an eye shaped portion of the spring 23 onto a hook 31 on the rod 22. The rod extends coaxially into a portion of the spring 23. The free end of the spring 23 is attached to one of the leg members 12 as explained hereinbefore. The hooked extension 29 of toggle mechanism 27 is attached to the other leg member 12 and the other hooked extension 28 of the toggle mechanism 27 is then attached to the furthest opening 26 from the toggle mechanism 27 in bar 25 which can be reached with the toggle mechanism in the open position. The toggle mechanism is then closed. Upon closing, the spring 23 is extended thus resulting in a force tending to pull the leg members 12 towards each other equal to the force exerted by the extended spring 23. The tension of the spring 23 holds the leg members 12 securely against the ground. As the ground compacts or shifts under the weight of the trailer and its occupants, the spring tension draws the leg members together and thus automatically adjusts the leg members so that constant contact is made with the ground.

Varying sized springs having varying spring constants can be utilized in practicing the present invention. It is preferred that the spring constant be approximately 100 pounds per inch or greater, however, this is not critical. The ground engaging foot members 18 preferably have upwardly curved edges 32 on the sides of the foot members which are toward the center of the trailer as shown in FIG. 1 to allow the foot member to move under the tension of spring 23 without digging into the ground.

The attaching means is also provided as shown in FIGS. 3 and 4 for securing each leg assembly in a retracted position along the bottom of the trailer during transport of the trailer. In the embodiment illustrated in FIG. 3, brackets 13 and 44 are used in conjunction with the rod 22 and spring 23 assembly. In the retracted position as shown in FIG. 3, the leg member 12 extends parallel to the underside of the trailer. In FIG. 4, the brackets 44 are extended from the underside of the trailer in such a manner that the leg members 12 in the retracted positions would extend at an angle to the longitudinal axis of the trailer as shown in the drawings. The leg members are held in the retracted positions by rod 22 and spring 23. In FIG. 3, the leg members are parallel to the underside of the trailer sliding through bracket 13(c). The end 31 of the leg members extend towards the center of the trailer and thus prevent the pivotal action of the attaching means 13. The leg members are held in this position by rod 22 and spring 23. In FIG. 4, the bracket 44 extends far enough down from the underside of the trailer so that the leg members can be moved upward beyond a position parallel to the underside of the trailer. The leg members angle upward toward the underside of the trailer and are held in this position by rod 12 and spring 23.

To position the support assembly of the embodiment shown in FIG. 3 in its retracted position, the toggle mechanism 27 is released and the toggle mechanism 27, rod 22 and spring 23 members removed. The leg members 12 are swung upward to a position parallel to the underside of the trailer and then moved toward the center of the trailer by sliding through bracket 13(c). The toggle mechanism 27, rod 22 and spring 23 members are repositioned between leg members 12 and the toggle mechanism 27 closed. In attaching the toggle mechanism to rod 23, the hooked extension 28 is placed in the furthest opening 26 from the toggle mechanism 27 as possible while the toggle mechanism is in its open position. When the toggle mechanism is closed, the spring 23 is again extended and produces a tension between the leg members 12 holding them firmly in their retracted position. In the embodiment shown in FIG. 5, the legs are simply swung upward until the end of the leg members contacts the underside of the trailer. The rod 22 and spring 23 are then again attached and toggle mechanism 27 is closed holding the leg members in the retracted position.

A further embodiment of the apparatus of this invention is shown in FIGS. 5 and 6. In this embodiment, the leg members 12 have slots 51 located in the end of the leg assembly which is attached to attaching means 52. A nut and bolt 53 extend through the slot 51 so that the leg members 12 can pivot about the nut and bolt 53 in a plane transverse of the trailer and can slide toward the center of the trailer when the legs are in a position parallel to the underside of the trailer. The operation of the apparatus shown in FIGS. 5 and 6 is similar to that for the apparatus shown in FIGS. 1, 2 and 3. To position the leg assembly of FIGS. 5 and 6 from the support position shown in FIG. 5 to the retracted position shown in FIG. 6, the toggle mechanism 27 is opened and rod 27 disconnected. Legs 12 aere raised to a position parallel to the underside of the trailer and then moved parallel to the underside of the trailer towards the center of the trailer. The rod member 27 is then attached and toggle mechanism 27 closed thereby holding leg members 12 in the retracted position.

It will be apparent to those skilled in the art that various changes may be made in size, shape, number and arrangement of parts described hereinbefore without departing from the spirit of this invention. Various means other than the rod 22 and spring 23, as exemplified in the above discussion, can be utilized to produce a force on the leg members tending to force the leg members together and thus automatically adjusting for any compaction or shifting of the ground underneath the ground engaging members.

In place of the rod 22 and spring 23 arrangement shown in FIGS. 1 – 4, a spring member itself could be used. The toggle mechanism would then connect to one end of the spring while the other end of the spring being connected to the leg member. In addition, instead of apparatus connecting the leg members, separate force members can be situated between a bracket attached to the edge of the trailer side and the leg member. Such a force means member is shown in FIGS. 7 and 8. The force producing member 35 comprises a spring 36, toggle means 37 and push rod 38. The member 35 is placed between a bracket 39 and the leg member 12. When the toggle means 37 is closed, the spring force is transmitted to push rod 38 and against the leg members. According to the teaching of this invention, the force applied to the leg members tends to move the legs toward each other. The same separate force producing means is used to restrain the leg members in retracted position as shown in Fig. 8 by being situated between bracket 40 on the side of the trailer and the leg member 12 holding leg member 12 securely in their respective retraction against bracket 33 in the retracted position.

The leg members 12 can also be round rather than rectangular as shown in FIGS. 1 – 8. When round legs are used as shown in FIG. 9, the upper section 91 is provided with internal threads and the lower section 92 provided with external threads. The ground engaging foot member 18 is attached to the lower leg section 92 so that it can rotate about the longitudinal axis of leg section 92. With this modified leg apparatus, the trailer can be leveled after the legs have been situated in their support position. That is, if after the stabilizing apparatus has been situated in its stabilizing and supporting position, it is found that one corner of the trailer is low with respect to another, the low corner can be jacked up by rotating the lower leg section with appropriate means such as the rod 93 shown in FIG. 9, thus extending the lower leg section further from the upper leg section. The low corner is thus raised with respect to the other corners. If the corner had been high rather than low, the lower leg section would have been rotated so that it retracts into the upper leg section, thus lowering the high corner with respect to the other corners.

What is claimed is:

1. A stabilizing and leveling support assembly for trailers, comprising:
   a. a pair of extensible leg assemblies,
   b. means for attaching one end of said leg assemblies to the underside of a trailer, one leg assembly adjacent each lateral side of the trailer with said leg assemblies being secured by said attaching means for a pivotal movement of said leg assemblies between an operative position extending downward and outward from the trailer and a raised position extending parallel to the underside of the trailer, said leg assemblies being secured to said attaching means for a sliding movement of said leg assemblies when the leg assemblies are in the raised position, the sliding movement being in a plane parallel to the underside of said trailer and towards the longitudinal axis of said trailer to a retracted position,
   c. means for applying a force to said leg assemblies in a direction transverse to the trailer and towards the longitudinal axis of said trailer, said force tending to move the leg assemblies towards each other when in the operative position and holding the leg assemblies in the retracted position.

2. A stabilizing and leveling support assembly for trailers as claimed in claim 1 wherein the means for applying the force to said leg assemblies comprises:
   a. an elongated member having a spring attached to one end thereof in an axial direction and a plurality of transverse openings in the opposite end thereof,
   b. a toggle mechanism having two extending hook members which are brought towards each other when the toggle mechanism is closed, wherein one hook member of the toggle mechanism is connected to one of the leg asemblies, the second hook member of the toggle mechanism is connected to one of the openings in said elongated member, and the spring is connected to the other leg assembly.

3. A stabilizing and leveling support assembly for trailers as claimed in claim 1 wherein the leg assembly has, at its end opposite that connected to the trailer, pivotally attached thereto a ground engaging foot member, said foot member rotatable about an axis parallel to the longitudinal axis of said trailer when the leg assembly is in its operative position.

4. A stabilizing and leveling support assembly for trailers as claimed in claim 1 wherein the leg assemblies comprise an upper and lower section whereby said lower section is received slidably within said upper section for telescopic adjustment.

5. A stabilizing and leveling support assembly for trailers as claimed in claim 1 wherein the leg assemblies comprise hollow upper and lower sections, said upper section having internal threads and said lower section having external threads which engage with the internal threads of said upper leg section, means for rotating said lower leg section when the leg assembly is in its operative position whereby the trailer can be raised or lowered.

6. A stabilizing and leveling support assembly as claimed in claim 1 wherein the means for applying the force to said leg assemblies comprises:
   a. an elongated member consisting of a spring, toggle mechanism and a push rod whereby said push rod is forced in an axial direction by said spring when said toggle mechanism is closed,
   b. bracket means extending down from the side of said trailer whereby said elongated member is positioned between said bracket means and said leg assembly and said toggle mechanism closed thereby pushing said push rod into forced engagement with said leg assembly.

7. A stabilizing and leveling support assembly as claimed in claim 1 wherein the means for attaching one end of said leg assemblies to the underside of said trailer comprises bracket means which coaxially receive the end of said leg assemblies, said bracket means being attached to the underside of said trailer for a pivotal movement in a plane transverse of said trailer.

8. A stabilizing and leveling support assembly for trailers as claimed in claim 7 wherein the means for applying the force to said leg assemblies comprises:
   a. an elongated member having a spring attached to one end thereof in an axial direction and a plurality of transverse openings in the opposite end thereof,
   b. a toggle mechanism having two extending hook members which are brought towards each other when the toggle mechanism is closed, wherein one hook member of the toggle mechanism is connected to one of the leg assemblies, the second hook member of the toggle mechanism is connected to one of the openings in said elongated member, and the spring is connected to the other leg assembly.

9. A stabilizing and leveling support assembly as claimed in claim 1 wherein the means for attaching one end of said leg assemblies to the underside of said trailer comprises a horizontal pin member which engages an elongated slot section located in the end of said leg assembly whereby said leg assembly can pivot about said pin member in a plane transverse of said trailer.

* * * * *